United States Patent
Retzer

[11] Patent Number: 5,878,091
[45] Date of Patent: Mar. 2, 1999

[54] APPARATUS AND METHOD FOR PATTERN ADAPTIVE OFFSET RESTORATION

[75] Inventor: Michael H. Retzer, Palatine, Ill.

[73] Assignee: Motorola, Inc., Schaumburg, Ill.

[21] Appl. No.: 982,345

[22] Filed: Nov. 27, 1992

[51] Int. Cl.$^6$ .................................................. H03D 1/00
[52] U.S. Cl. ............................................ 375/340; 375/287
[58] Field of Search ................................ 375/76, 99, 101, 375/104, 317, 319, 340, 287, 286, 290; 329/318, 320, 321, 303, 306; 455/295; 2/296; 307/351; 327/307, 58, 60, 61, 62

[56] References Cited

U.S. PATENT DOCUMENTS

| | | |
|---|---|---|
| 3,846,710 | 11/1974 | Chapman . |
| 4,926,442 | 5/1990 | Bukowski et al. ..................... 375/76 |
| 4,998,289 | 3/1991 | Rabe et al. ..................... 455/296 X |
| 5,003,196 | 3/1991 | Kawaguchi ..................... 307/351 X |
| 5,025,251 | 6/1991 | Mittel et al. ..................... 375/76 X |
| 5,287,063 | 2/1994 | Izawa ..................... 307/351 X |

*Primary Examiner*—Tesfaldet Bocure
*Assistant Examiner*—Bryan Webst
*Attorney, Agent, or Firm*—Hugh C. Dunlop

[57] ABSTRACT

An apparatus and method adaptable to desired offsets for determining an undesired offset of a signal having a maximum and a minimum state that includes: providing a peak and trough estimate of, respectively, the maximum and minimum amplitude state; averaging such estimates to provide a reference level that is proportional to the undesired offset; and controlling the peak and trough estimates whenever a comparison of the signal and the reference level is, respectively, indicative of the maximum and minimum amplitude states to thus assure adaptation to the desired offset of the signal.

10 Claims, 2 Drawing Sheets

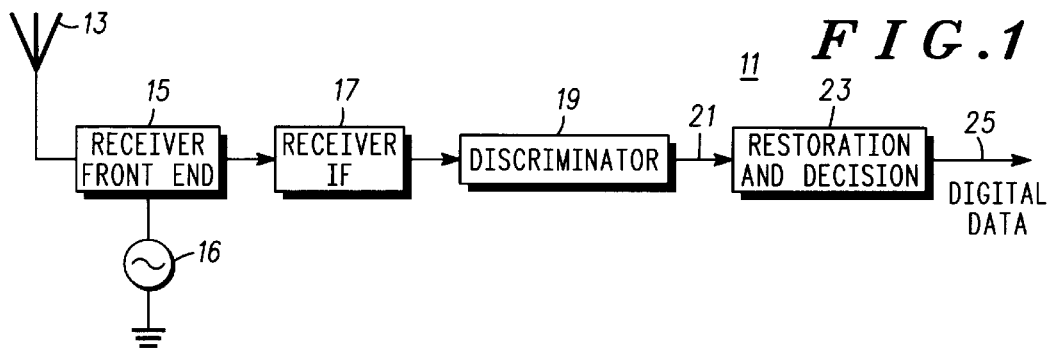
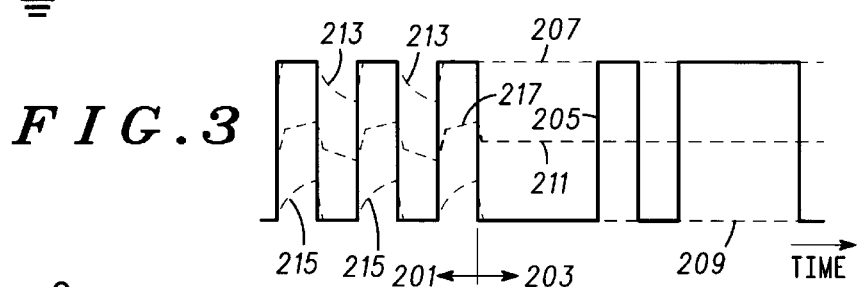
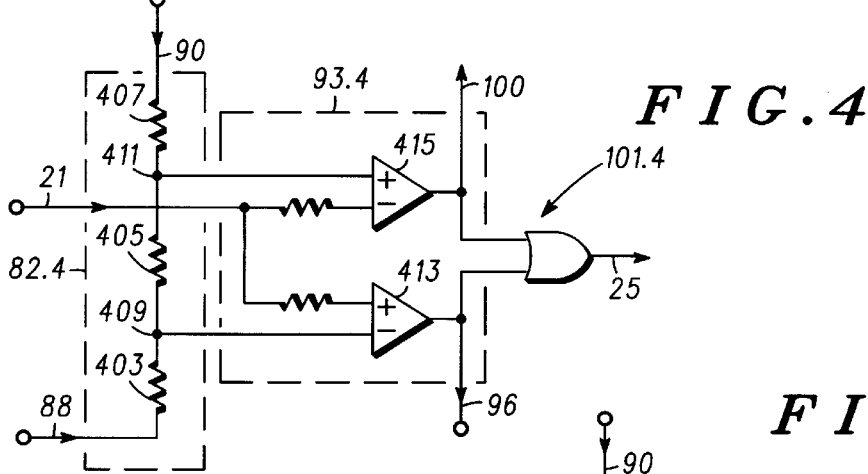
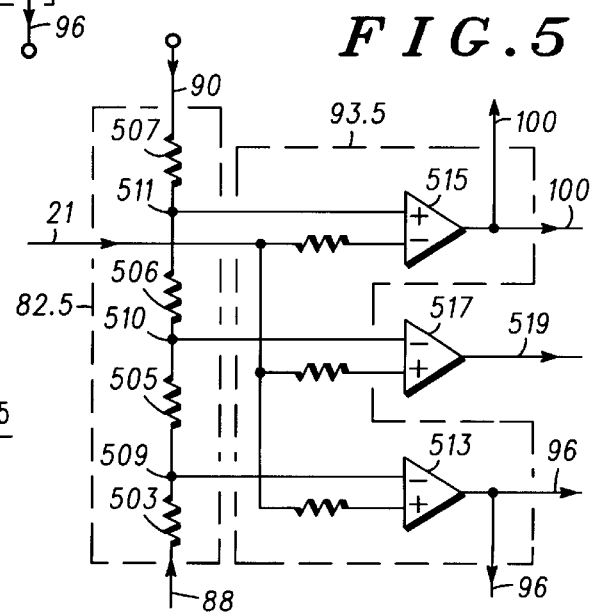
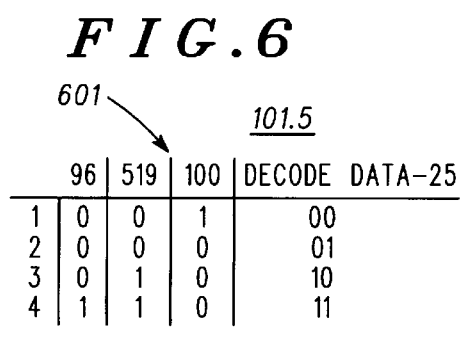

APPARATUS AND METHOD FOR PATTERN ADAPTIVE OFFSET RESTORATION

FIELD OF THE INVENTION

This invention deals with signal demodulation and more specifically but not limited to adaptively eliminating an offset from such signal.

BACKGROUND OF THE INVENTION

A modulating signal to be used for modulating a transmitter may be viewed as having a reference level (the DC part of the signal) and an amplitude varying with time about that reference level. Often this modulating signal, for example analog voice, will have a reference level of "0" or a none zero reference level that is of no consequence to users of the signal. When this reference level is of consequence to users of the signal additional problems may be presented to practitioners that wish to send this signal over, for example, a wireless communications system. In such circumstances not only must the original reference level be recovered but additional problems introduced by the communications system must be eliminated.

For example in a wireless communications system relying on radio waves, the modulating signal is typically imposed on a radio signal as frequency variation about an assigned transmit frequency. For any number of practical reasons the actual frequency of a transmitted radio signal will often vary slightly from the assigned frequency. This variation may be referred to as a transmit error. Similarly a receiver bent on receiving this radio signal, while nominally tuned to the assigned frequency, will usually introduce a receive error (variation from the assigned frequency). These frequency errors in combination may result in a reference level error or offset at the receiver output. When the modulating signal requires the reference level for accurate demodulation, for example a data signal, this reference level error or undesired offset will usually need to be eliminated.

To this end practitioners have estimated a reference level by averaging a maximum amplitude estimate and a minimum amplitude estimate. This approach, without more, works reasonably well unless and until a pattern within the signal is encountered. A pattern in for example a data signal is experienced when the data signal has a desired, nonzero offset over a time period of consequence, e.g. a run of a particular nonzero data character. Under such circumstances either the maximum or minimum amplitude estimate tends to decay causing an error in the estimated reference level. When this error becomes significant, depending in turn on the precise data signal, etc. an unacceptable degree of inaccuracy in the demodulated signal may result.

Another solution at least conceptually, suggests locking the receiver frequency to the transmitter frequency to help eliminate the reference level offsets. Unfortunately this approach is generally considered impractical due to the degree of complexity involved. To date the absence of practical solutions, if not paucity of solutions, has often resulted in practitioners resorting to simply disallowing modulating signals with desired offsets beyond some boundary. Such disallowance amounts to tacit acceptance of an otherwise unnecessary limitation on the communications system.

Clearly a need exists for a method and apparatus that accurately determines an undesired offset in a signal, such method and apparatus being further capable of pattern adaptive offset restoration.

SUMMARY OF THE INVENTION

The aforementioned needs are resolved by the instant invention wherein an apparatus, adaptable to desired offsets, for determining an undesired offset of a signal, such signal having a maximum and a minimum amplitude state, includes: peak estimating circuits, coupled to the signal and having a peak control input, for providing a peak estimate of the maximum amplitude state; trough estimating circuits, coupled to the signal and having a trough control input, for providing a trough estimate of the minimum amplitude state; an averaging function, responsive to the peak and the trough estimates, for providing a reference level that is proportional to the undesired offset; and control circuits, coupled to the peak and the trough control inputs and responsive to the reference level, for controlling the peak estimating circuits and the trough estimating circuits to assure the apparatus adapts to a desired offset by enabling the peak estimating circuits and the trough estimating circuits whenever a comparison of the signal and the reference level is, respectively, indicative of the maximum and minimum amplitude states.

The above apparatus, for example, adaptable to desired offsets, for determining an undesired offset of a signal, such signal having a maximum and a minimum amplitude state, executes a method including the steps of: providing a peak estimate of the maximum amplitude state; providing a trough estimate of the minimum amplitude state; providing, responsive to the peak and the trough estimates, a reference level that is proportional to the undesired offset; and controlling, responsive to the reference level, the peak estimate and the trough estimate to assure the apparatus adapts to a desired offset whenever a comparison of the signal and the reference level is, respectively, indicative of the maximum and minimum amplitude states.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

FIG. 1 is a representative diagram of a receiver operating in accordance with the instant invention.

FIG. 3 is a diagram indicative of the effect of the FIG. 2 embodiment on a received signal.

FIG. 4 is an apparatus operating in accordance with a first alternative embodiment of the instant invention.

FIG. 5 is an apparatus operating in accordance with a second alternative embodiment of the instant invention.

FIG. 6 is a look up table used in conjunction with the apparatus of FIG. 5.

DETAILED DESCRIPTION OF A PREFERRED EMBODIMENT

Figure 2:
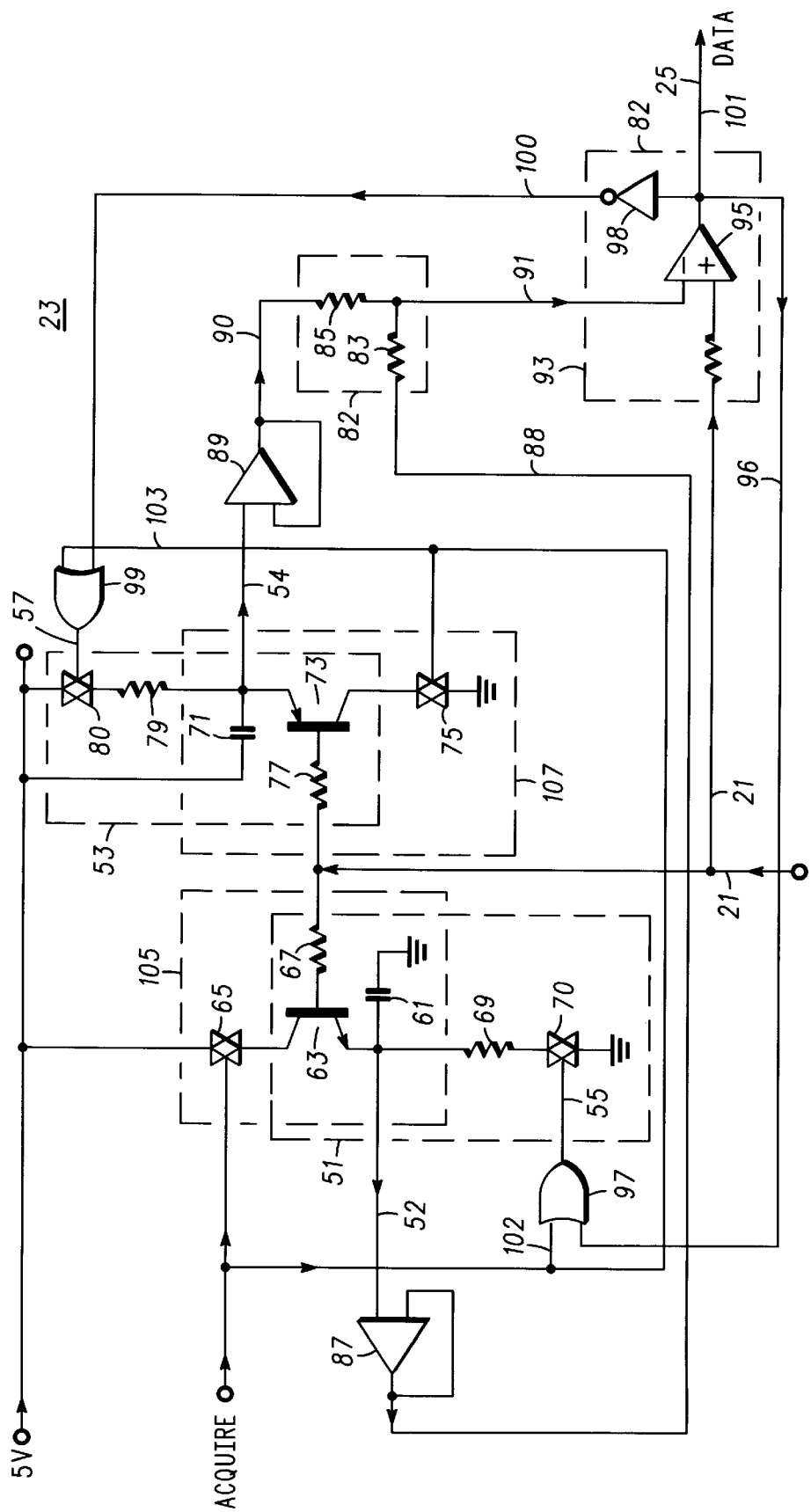
FIG. 2 is a more detailed diagram of a portion of the FIG. 1 receiver depicted in accordance with a preferred embodiment of the instant invention.

Referring to FIG. 1, a representative diagram of a radio receiver (11) is depicted. The radio receiver (11) includes an antenna (13) for absorbing a signal, such as a data modulated radio signal, a receiver front end (15), coupled to the antenna (13), for initial processing and, by mixing the radio signal with a LO signal from local oscillator (16), conversion of the radio signal to an IF frequency, a receiver IF (17), coupled to the receiver front end (15), for additional amplification and filtering of the radio signal at the IF frequency, and, coupled thereto, a discriminator (19). The discriminator (19) or the equivalent converts the radio signal variations, such as frequency or phase, into a corresponding signal, such as a data signal, that may have an undesirable or DC offset in addition to a maximum and a minimum amplitude state, at output (21). The signal at output (21) is then coupled to a restoration and decision function (23) which in turn provides a demodulated signal, such as digital data at output (25).

Referring now to FIG. 2 wherein like reference numbers refer to like elements from FIG. 1, a preferred embodiment of the restoration and decision function (23) is depicted. The signal at output (21) of FIG. 1 is shown coupled to a peak estimating circuit (51), operating to provide, at output (52), a peak estimate of the maximum amplitude state of the signal and a trough estimating circuit (53), operating to provide, at output (54), a trough estimate of the minimum amplitude state of the signal. The peak and trough estimating circuits, respectively, include a peak control input (55) and a trough control input (57).

The peak estimating circuit (51) provides the peak estimate by charging capacitor (61), via transistor (63), if enabled at gate (65), or the base emitter junction of transistor (63) and resistor (67) to a voltage corresponding to the maximum amplitude state of the signal. The voltage on capacitor (61) will exponentially decay via the current through resistor (69) when gate (70) is enabled. Usually, resistor (69) should be selected to be approximately an order of magnitude larger than resistor (67), for example 3600 vs 360 ohms. Similarly, the trough estimating circuit (53) provides the trough estimate by charging capacitor (71), via transistor (73), if enabled at gate (75), or the base emitter junction of transistor (73) and resistor (77) to a voltage corresponding to the minimum amplitude state of the signal. The voltage on capacitor (71) will exponentially decay via the current through resistor (79) when gate (80) is enabled. Usually, resistor (79) should be selected to be approximately an order of magnitude larger than resistor (77), for example 3600 vs 360 ohms.

An averaging circuit (82) including resistor (83) and resistor (85) is responsive, and coupled, to the peak and trough estimates by, respectively, amplifier (87) at input (88) and amplifier (89) at input (90). The averaging circuit (82) operates to provide a reference level, here a voltage equivalent to a resistive divider ratio times the difference between the peak and trough estimates greater than the trough estimate, at output (91) that is proportional to an undesired offset, such as a DC offset.

A control circuit (93), including comparator (95) coupled, at output (96) to OR gate (97) and via invertor (98) to OR gate (99) at output (100), is responsive to the reference level. OR gate (97) and OR gate (99) are respectively coupled to peak control input (55) and trough control input (57). The control circuit (93) controls the peak estimating circuit (51) and the trough estimating circuit (53) whenever a comparison of the signal, such as a data signal, at input (21) and the reference level at output (91) is respectively indicative of the maximum amplitude state and minimum amplitude state.

For example if the data signal exceeds the reference level, indicating a maximum amplitude state for, as here, a two state signal, comparator (95) generates a "true" or positive output that via OR gate (97) and peak control input (55) enables gate (70) thereby allowing current flow through resistor (69). Such current flow allows or causes peak estimating circuit (51) to provide a new or updated peak estimate. Further the "true" output is inverted by invertor (98) and hence via trough control input (57) gate (80) is disabled thus interrupting current flow through resistor (79) thereby causing trough estimating circuit (53) to forego updating the trough estimate while the data signal exceeds the reference level. Similarly, when the data signal is less than the reference signal the trough estimating circuit (53) updates the trough estimate whereas the peak estimating circuit (51) is disabled.

By such action the reference level and hence the restoration and decision apparatus (23) can be said to adapt to any desired offset, such as a data pattern including an extended run of "trues" or "falses" (1s or 0s). The remaining task of the restoration and decision apparatus (23) is a decision function (101) responsive to the comparison of the signal, such as a data signal, at input (21) and the reference level at output (91) for selecting a data value dependent on the comparison satisfying a predetermined condition. When the signal is a two state data signal, as here, and the above apparatus and procedures have been used or performed this reduces to selecting a "1" when the comparison at output (25) is "true" (positive potential) and selecting a "0" when "false" (approx. zero potential).

Other advantageous characteristics of the instant invention will now be described. In some applications such as a packet data system the restoration and decision apparatus (23) not only has to work well in an ongoing normal mode such as described above but also must rapidly acquire at least an initial estimate of the reference level. This may be facilitated by acquisition circuitry, coupled to the peak and the trough estimating circuits (51, 53), for enabling the peak and trough estimating circuits for an acquisition time. In FIG. 2 the peak estimating circuit (51) is enabled by the gate (70) whenever, such as for the duration of an acquisition time, a input (102) of OR gate (97) is "true" regardless of any comparison of the reference level and the signal. Similarly the trough estimating circuit may be forced enabled by a "true" at input (103) of OR gate (99). This acquisition circuitry and operation may be particularly advantageous in a packet data system where the packets each have a predetermined header that does not have any desired offsets, such as caused by data patterns.

As alluded to above in describing the operation of the peak and trough estimating circuits (51, 53), each such circuit includes, respectively, time constant circuitry (105, 107) which establishes a time constant, for example an RC time constant, associated with providing the peak and trough estimates. Regarding the peak estimating means (51), time constant circuitry (105) includes the resistor (67) coupled to the base of the transistor (63), the capacitor (61) coupled from the emitter of the transistor (63) to a common potential (ground), and the gate (65) coupled from a voltage source to the collector of transistor (63).

When the gate (65) is disabled the time constant is essentially determined by the RC time constant established by the resistor (67) and the capacitor (61). Gate (65) can be viewed as an apparatus, coupled to the peak estimating means (51), for adjusting this time constant. When this gate is enabled the time constant will be set by the capacitor (61) and the on resistance of transistor (63) (ordinarily small compared to resistor (67)). Similarly the time constant of the trough estimating means (53) is essentially set by the resistor (77) and the capacitor (71) when the gate (75) is disabled. This time constant is adjusted by enabling gate (75) and thereafter becomes essentially the on resistance of transistor (73) in combination with the capacitor (71).

Referring to FIG. 3, a composite depiction of waveforms over time as observed in the FIG. 2 apparatus is shown. The time period includes an acquisition time period (201) followed by a normal operation time period (203). The waveforms include a two state data signal (205), such as may be observed at output (21) under relatively ideal and noiseless conditions, and in addition the peak estimate (207), the trough estimate (209), and the reference level (211) that would be expected in response thereto during both time periods. Recalling that both the peak and trough estimating circuits (51, 53) are enabled during the acquisition time period (201), the expected exponential decays (213, 215) in, respectively, the peak estimate (207) and trough estimate (209) together with the impacts (217) on the reference level (211) are depicted in FIG. 3. During the normal operation time period (203), from above, the peak estimating circuit is disabled during a "false" (minimum amplitude state) and the trough estimating circuit is disabled during a "true" (maximum amplitude state). Thus by observation and as expected the exponential decays (213, 215) together with the impacts (215) on the reference level (211) are absent during the normal operation time (203). Hence the restoration and decision apparatus (23) is able to determine an undesired offset, here the reference level (211), as well as adapt to desired offsets in data signal (205).

Further appreciation of the instant invention and it's ready adaptibility to different applications may be gained from the alternative embodiment shown in FIG. 4 wherein like reference numerals refer to like elements from previously discussed figures. This embodiment is particularly suitable for a restoration and decision apparatus for a duobinary encoded data system. Duobinary data has three valid states with both a positive and a negative state corresponding to a logical "true" or "1" and a zero state corresponding to a logical "false" or "0". An averaging circuit (82.4), a control circuit (93.4), and a decision function (101.4) are depicted and it is understood that they are intended to replace respectively, the averaging circuit (82), the control circuit (93), and the decision function (101) of FIG. 2. Inputs (21, 90, 88) and outputs (25, 96, 100) correspond one for one to the FIG. 2 like designated elements.

The averaging circuit (82.4) including, in series, resistor (403), resistor (405), and resistor (407) is responsive, and coupled, to the peak and trough estimates at, respectively, input (88) and input (90). The averaging circuit (82.4) operates to provide a reference level, here two voltages, one each at node (409) and node (411), that are equivalent to an appropriate resistive divider ratio times the difference between the peak and trough estimates greater than the trough estimate, at the nodes (409, 411). Such voltages are thus proportional to an undesired offset, such as a DC offset.

The control circuit (93.4), including comparator (413) coupled, at output (96), to OR gate (97) and comparator (415) coupled to OR gate (99) at output (100), is responsive to the reference level. Specifically and respectively the comparators (413 and 415) are coupled to the nodes (409 and 411). Thus arranged and operating as described above with reference to FIG. 2, the control circuit (93.4) controls the peak estimating circuit (51) and the trough estimating circuit (53) whenever a comparison of the signal, such as a data signal, at input (21) and the reference level at nodes (409, 411) is respectively indicative of the maximum and the minimum amplitude state.

For example if the data signal exceeds the voltage at node (409), indicating a maximum amplitude state for, as here, a three state signal, comparator (413) generates a "true" or positive output that, similar to above, causes the peak estimating circuit (51) to provide a new or updated peak estimate. Similarly, when the data signal is less than the voltage at the node (411) the trough estimating circuit (53) updates the trough estimate. In all other cases both the peak and trough estimating circuits (51 and 53) are disabled. Again the reference level and hence the restoration and decision apparatus (23), as embodied in FIG. 4, can be said to adapt to any desired offset.

The decision function (101.4) includes OR gate (417) and is responsive to the comparison, specifically, comparators (413, 415). The decision function (101.4) selects a data value dependent on the comparison satisfying a predetermined condition. For duobinary, as here, when either output (96) from comparator (413) or output (100) from comparator (415) is "true" (positive potential) Or gate (417) will provide a "true" or "1" at output (25). Otherwise the output (25) is "false" or "0" (approx. zero potential).

Yet a further embodiment is shown in FIG. 5 and FIG. 6 wherein like reference numerals refer to like elements from previously discussed figures. This embodiment is particularly suitable for a restoration and decision apparatus for a four level encoded data system. An averaging circuit (82.5), a control circuit (93.5), and a decision function (101.5) are depicted and it is understood that they are intended to replace respectively, the averaging circuit (82), the control circuit (93), and the decision function (101) of FIG. 2. Inputs (21, 90, 88) and outputs (25, 96, 100) correspond one for one to the FIG. 2 like designated elements.

The averaging circuit (82.5) including, in series, resistor (503), resistor (505), resistor (506) and resistor (507) is responsive, and coupled, to the peak and trough estimates at, respectively, input (88) and input (90). The averaging circuit (82.5) operates to provide a reference level, here three voltages, one each at node (509), node (510), and node (511), that are equivalent to an appropriate resistive divider ratio times the difference between the peak and trough estimates greater than the trough estimate, at the nodes (509, 510, 511). Such voltages are thus proportional to an undesired offset, such as a DC offset.

The control circuit (93.5), including comparator (513) coupled, at output (96) to OR gate (97) and comparator (515) coupled to OR gate (99) at output (100), is responsive to the reference level. Specifically and respectively the comparators (513 and 515) are coupled to the nodes (509 and 511). Thus arranged and operating as described above with reference to FIG. 2, the control circuit (93.5) controls the peak estimating circuit (51) and the trough estimating circuit (53) whenever a comparison of the signal, such as a data signal, at input (21) and the reference level at nodes (509, 511) is respectively indicative of the maximum amplitude state and minimum amplitude state.

For example if the data signal exceeds the voltage at node (509), indicating a maximum amplitude state for, as here, a four state signal, comparator (513) generates a "true" or positive output (96) that, similar to above, causes the peak estimating circuit (51) to provide a new or updated peak estimate. Similarly, when the data signal is less than the voltage at the node (511) the trough estimating circuit (53) updates the trough estimate. In all other cases both the peak and trough estimating circuits (51 and 53) are disabled. Again the reference level and hence the restoration and decision apparatus (23), as embodied in FIG. 5, can be said to adapt to any desired offset.

The decision function (101.5) includes comparator (517) with output (519) and the FIG. 6 look up table (601). The decision function (101.5) is responsive to the comparison, specifically, comparators (513, 515) at, respectively, outputs (96, 100) and comparator (517), coupled to node (510) and providing output (519). The decision function (101.5) selects a data value dependent on the comparison satisfying a predetermined condition. The FIG. 6 look up table includes columns labeled as 96, 519, 100 to correspond with outputs (96, 519, 100) and rows (1, 2, 3, 4) corresponding to data values or levels 1, 2, 3, 4. The contents of the columns are the logical levels, "0" or "1" associated with the outputs (96, 519, 100). The logical levels within a row are the logical levels expected or the predetermined condition required to select a particular data value. When, for example, a microprocessor based logic unit (not specifically shown) determines that all logic levels within a given row are satisfied a data value corresponding to that row may be selected and made available at output (25). Specifically as an example, consider outputs (96, 519, 100) having, respectively, the logic levels "0", "1", "0". These logic levels correspond to row 3 in the look up table and therefore the decoded data is "10".

The above described embodiments of the instant invention have disclosed a highly flexible inventive apparatus and procedure for determining the undesired offset in a signal even when the signal includes a desired offset. Further, the teachings of the instant invention have been shown to be particularly advantageous for packet data systems. Other advantages and applications within the true scope and spirit of the instant invention as defined by the appended claims below will become clear to practitioners of the art.

I claim:

1. An apparatus, adaptable to desired offsets of a signal, for determining an undesired offset of the signal, such signal having a maximum and a minimum amplitude state, the apparatus comprising:

peak estimating means, coupled to the signal and having a peak control input, for providing a peak estimate of the maximum amplitude state;

trough estimating means, coupled to the signal and having a trough control input, for providing a trough estimate of the minimum amplitude state, said peak and said trough estimating means including time constant circuitry for setting a time constant;

means, coupled to said peak and said trough estimating means, for adjusting said time constant of said peak and said trough estimating means;

averaging means, responsive to said peak and said trough estimates, for providing a reference level that is proportional to the undesired offset;

control means, coupled to said peak and said trough control inputs and responsive to said reference level, for controlling said peak estimating means and said trough estimating means to assure the apparatus adapts to a desired offset by enabling, respectively, said peak estimating means and said trough estimating means whenever a comparison of the signal and said reference level is, respectively, indicative of the maximum and minimum amplitude states; and acquisition means, coupled to said peak and said trough control means, for enabling said peak and said trough estimating means for an acquisition time period.

2. An apparatus, adaptable to desired offsets of a signal, for determining an undesired offset of the signal, such signal having a maximum and a minimum amplitude state, the apparatus comprising:

peak estimating means, coupled to the signal and having a peak control input, for providing a peak estimate of the maximum amplitude state;

trough estimating means, coupled to the signal and having a trough control input, for providing a trough estimate of the minimum amplitude state;

averaging means, responsive to said peak and said trough estimates, for providing a reference level that is proportional to the undesired offset; and control means, coupled to said peak and said trough control inputs and responsive to said reference level, for controlling said peak estimating means and said trough estimating means to assure the apparatus adapts to a desired offset by enabling, respectively, said peak estimating means and said trough estimating means whenever a comparison of the signal and said reference level is, respectively, indicative of the maximum and minimum amplitude states, wherein said peak and said trough estimating means include time constant circuitry for setting a time constant, the apparatus further including:

means, coupled to said peak and said trough estimating means, for adjusting said time constant of said peak and said trough estimating means.

3. An apparatus, adaptable to data patterns, for demodulating a data signal, the data signal having a DC offset and a maximum and a minimum amplitude state, the apparatus comprising:

peak estimating means, coupled to the data signal and having a peak control input, for providing a peak estimate of the maximum amplitude state;

trough estimating means, coupled to the data signal and having a trough control input, for providing a trough estimate of the minimum amplitude state, said peak and said trough estimating means including time constant circuitry for setting a time constant;

means, coupled to said peak and said trough estimating means, for adjusting said time constant of said peak and said trough estimating means;

averaging means, responsive to said peak and said trough estimates, for providing a reference level that is proportional to the DC offset;

control means, coupled to said peak and said trough control inputs and responsive to said reference level, for controlling said peak estimating means and said trough estimating means to assure the apparatus adapts to a data pattern by enabling, respectively, said peak estimating means and said trough estimating means whenever a comparison of the data signal and said reference level is, respectively, indicative of the maximum and minimum amplitude states; and decision means, responsive to said comparison, for selecting a data value when said comparison satisfies a predetermined condition.

4. The apparatus of claim 3 further including:

acquisition means, coupled to said peak and said trough control means, for enabling said peak and said trough estimating means for an acquisition time period.

5. A radio receiver for receiving a data modulated radio signal, the radio receiver adaptable to data patterns and comprising:

receiver means, coupled to the data modulated radio signal, for providing a data signal having a DC offset and a maximum and a minimum amplitude state;

peak estimating means, coupled to the data signal and having a peak control input, for providing a peak estimate of said maximum amplitude state;

trough estimating means, coupled to the data signal and having a trough control input, for providing a trough estimate of said minimum amplitude state, said peak and said trough estimating means including time constant circuitry for setting a time constant;

means, coupled to said peak and said trough estimating means, for adjusting said time constant of said peak and said trough estimating means;

averaging means, coupled to said peak and said trough estimates, for providing a reference level that is proportional to said DC offset; and control means, coupled to said peak and said trough control inputs and responsive to said reference level, for controlling said peak estimating means and said trough estimating means to assure the radio receiver adapts to a data pattern by enabling, respectively, said peak estimating means and said trough estimating means whenever a comparison of said data signal and said reference level is, respectively, indicative of the maximum and minimum amplitude states.

6. The radio receiver of claim 5 further including:

acquisition means, coupled to said peak and said trough control means, for enabling said peak and said trough estimating means for an acquisition time period.

7. The radio receiver of claim 5 further including a decision means, responsive to said comparison, for selecting a data value when said comparison satisfies a predetermined condition.

8. The radio receiver of claim 7 further including:

acquisition means, coupled to said peak and said trough control means, for enabling said peak and said trough estimating means for an acquisition time period.

9. In an apparatus, adaptable to data patterns, for decoding a data signal, the data signal having a DC offset and a maximum and a minimum amplitude state, a method including the steps of:

providing a peak estimate of the maximum amplitude state;

providing a trough estimate of the minimum amplitude state;

providing, responsive to said peak and said trough estimates, a reference level that is proportional to the DC offset;

controlling, responsive to said reference level, said step of providing a peak estimate and said step of providing a trough estimate to assure the apparatus adapts to a data pattern whenever a comparison of the data signal and said reference level is, respectively, indicative of the maximum and minimum amplitude states;

selecting a data value when said comparison satisfies a predetermined condition; and acquiring said peak estimate, said trough estimate, and said reference level regardless of said comparison during an acquisition time period.

10. The method of claim 9 further including the step of:

acquiring said peak estimate, said trough estimate, and said reference level regardless of said comparison during an acquisition time period.

* * * * *